(No Model.)

C. PRESTON.
PAN FOR BAKING AND ROASTING.

No. 404,558.  Patented June 4, 1889.

Witnesses:
James F. McGuire
Thomas G. Taylor

Inventor:
Clarissa Preston

UNITED STATES PATENT OFFICE.

CLARISSA PRESTON, OF PITTSBURG, PENNSYLVANIA.

PAN FOR BAKING AND ROASTING.

SPECIFICATION forming part of Letters Patent No. 404,558, dated June 4, 1889.

Application filed September 24, 1888. Serial No. 286,255. (No model.)

*To all whom it may concern:*

Be it known that I, CLARISSA PRESTON, a citizen of the United States, residing at Pittsburg, in the county of Allegheny, State of Pennsylvania, have invented a new and useful Pan for Roasting and Baking, of which the following is a specification.

My invention consists of a pan with the ends turned up the same as an ordinary bread-pan, the sides extended up and grooved (see letter A) to permit a cover to slide on or off, and two wires running the full length of and half the width (see letter C) and bent across the ends of the pan, and a cover bent the shape of the pan, with groove to fit the groove of the pan and slide on or off, (see Figure 3, letter A,) the ends of said cover being closed by a gate or door (see letter B) fastened by a hinge to the top of the cover and held by wires across the end when closed. (See Fig. 2.)

I am aware that prior to my invention roasting-pans have been made and connected together by hinges, making a double pan; but the operator is compelled to remove the pan from the oven and raise one up before she can see the contents, which is not necessary with my invention.

Similar letters refer to similar parts throughout the several views.

Figure 1:
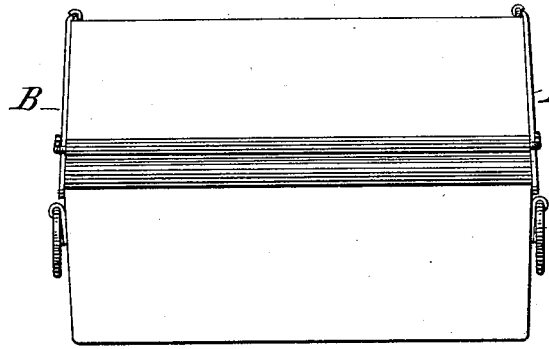
Figure 2:
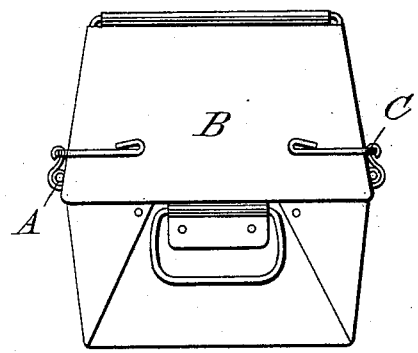
Figure 3:
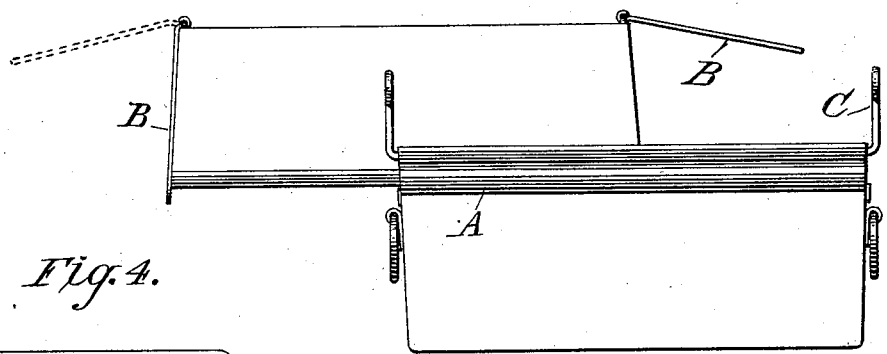
Figure 4:
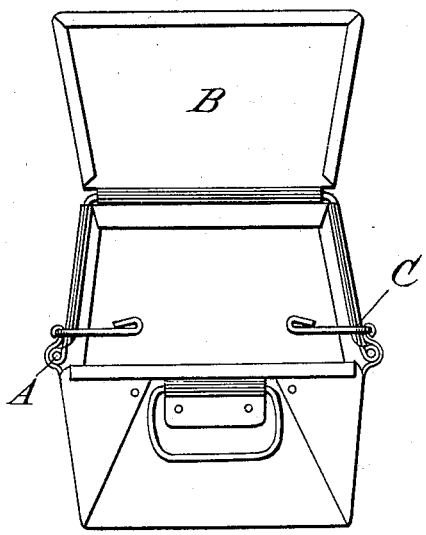
Figure 5:
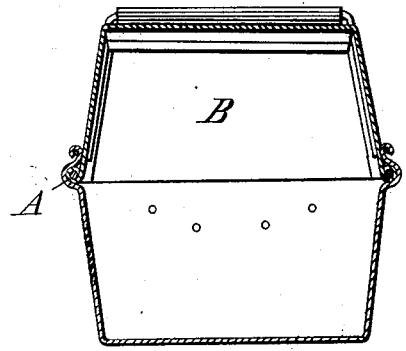

Fig. 1 is a full-length side view of the pan and cover with both ends B closed. Fig. 2 is an end view of the pan and cover with the doors (letter B) closed and the wires C across the end to hold the doors in place. Fig. 3 is a full-length side view of pan and cover with cover partly drawn off, showing side grooves A with the doors B partly open and the side wires C raised to a perpendicular position. Fig. 4 is an end view of the pan with cover on, with the doors B raised to a perpendicular position and the wires C across the end. Fig. 5 is a cross-section of pan and cover.

I claim—

A bake-pan composed of upper and lower sections, the lower section having closed sides and ends and provided with longitudinal grooves along its upper edge, and the upper section having closed sides and hinged doors at its ends and resting in the grooves of the lower section.

CLARISSA PRESTON.

Witnesses:
W. N. JARRETT,
A. C. JARRETT.